United States Patent [19]
Ota et al.

[11] Patent Number: 5,913,388
[45] Date of Patent: Jun. 22, 1999

[54] BICYCLE BRAKE DEVICE

[75] Inventors: Katsuyuki Ota; Shinichi Takizawa, both of Sakai, Japan

[73] Assignee: Shimano, Inc., Osaka, Japan

[21] Appl. No.: 08/924,445

[22] Filed: Aug. 26, 1997

[30] Foreign Application Priority Data

Sep. 18, 1996 [JP] Japan ..................................... 8-245981

[51] Int. Cl.⁶ ..................................................... B62L 3/00
[52] U.S. Cl. .................................... 188/24.22; 188/24.12; 188/24.15
[58] Field of Search ............................ 188/24.12, 24.15, 188/24.22, 24.11

[56] References Cited

U.S. PATENT DOCUMENTS

| | | | |
|---|---|---|---|
| 4,290,507 | 9/1981 | Brown ................................. | 188/24.15 |
| 4,765,443 | 8/1988 | Cunningham ........................ | 188/24.21 |
| 4,969,539 | 11/1990 | Ishibashi .............................. | 188/24.21 |
| 5,012,900 | 5/1991 | Ishibashi .............................. | 188/24.21 |
| 5,099,958 | 3/1992 | D'Aluisio ............................ | 188/24.22 |
| 5,228,542 | 7/1993 | Mack .................................... | 188/24.12 |
| 5,566,789 | 10/1996 | Allen .................................... | 188/24.15 |
| 5,636,716 | 6/1997 | Sugimoto et al. ................... | 188/24.22 |
| 5,649,609 | 7/1997 | Li et al. ................................ | 188/24.19 |

FOREIGN PATENT DOCUMENTS

| | | |
|---|---|---|
| 901118 | 5/1985 | Belgium . |
| 0 185 642 | 6/1986 | European Pat. Off. . |
| 885423 | 9/1943 | France . |
| 3709804 A1 | 10/1988 | Germany . |

OTHER PUBLICATIONS

European Search Report for EP 97307178.0, dated Sep. 24, 1998.

*Primary Examiner*—Peter M. Poon
*Attorney, Agent, or Firm*—James A. Deland

[57] ABSTRACT

A bicycle brake device brakes a wheel by pressing first and second opposing brake shoes against the wheel in response to operation of a control cable having an inner cable that moves in first and second directions relative to an outer casing. The first brake link includes a first support component for swingably mounting the first brake link to the bicycle, a first shoe attachment component, and an outer stop component for fixing the outer casing of the control cable. The second brake link includes a second support component for swingably mounting the second brake link to the bicycle and a second shoe attachment component. An inner cable receiving mechanism is coupled to the second brake link for receiving the inner cable so that the second brake link moves in response to movement of the inner cable, wherein the inner cable receiving mechanism includes a movement variation mechanism for varying the rate of movement of the second brake link per unit movement of the inner cable. A transmission mechanism extends between the first brake link and the second brake link so that movement of the inner cable causes movement of both the first brake link and the second brake link.

19 Claims, 13 Drawing Sheets

BICYCLE BRAKE DEVICE

BACKGROUND OF THE INVENTION

The present invention is directed to a bicycle brake device and, more particularly, to a bicycle brake device of the type that brakes a wheel by pressing first and second opposing brake shoes against the wheel in response to operation of a control cable having an inner cable that moves relative to an outer casing.

The shoe-pressure type of brake devices used in bicycles generally brake the wheels by pressing a pair of opposing brake shoes against the wheel when an inner cable positioned on the inside of an outer casing is pulled. With a brake device such as this, a pair of brake links is swingably attached to the frame or the like. Shoe attachment components are attached so that they each face one of these brake links, and brake shoes are mounted on these shoe attachment components. The distal end of an inner cable or the distal end of an outer casing is stopped at the brake links. When the brake lever attached to the handlebar is operated and the inner cable is pulled, the brake links swing in the direction in which they draw nearer to each other, and this swinging causes the brake shoes to press against the wheel. The amount of movement of the brake shoes, that is, the feed of the brake links (the amount they swing), increases roughly in proportion to the amount the inner cable is pulled.

A gap of several millimeters, for example, is required between the brake shoes and the lateral surfaces of the wheel rim. The purpose of this is to prevent the brake shoes from coming into contact with the rim as a result of axial runout of the rim or the like. Because of this gap between the brake shoes and the lateral surfaces of the wheel rim, there is a time lag between the operation of the brake lever and the point when the brake shoes actually hit the rim and braking commences. In order to minimize this time lag, one known brake device disclosed in U.S. Pat. No. 4,765,443 is equipped with a rapid traverse mechanism that quickly moves the brake links at the start of braking. This brake device is equipped with a pair of left and right brake links, a return spring, and a rapid traverse cam positioned between the brake links. Rollers that each have a cam groove formed in its peripheral surface are mounted to the upper ends of the brake links, and these cam grooves engage with the rapid traverse cam. Brake shoes are mounted to the lower ends of the brake links, and a swing center mounted on a seat provided to the bicycle fork is provided in the center of each brake link. A return spring is provided in order to bias the brake links to the brake release side. Adjustment of the spring force of this return spring allows the swing balance (feed balance) of the brake links in the release position to be adjusted and allows the braking commencement position of the brake links to be made even.

The rapid traverse cam is linked to the inner cable and rises when the inner cable is pulled. The rapid traverse cam has on both edges a cam component that engages with the cam groove in each of the brake links. The spacing of these cam components gradually widens from the top to the bottom, with a less rapid widening portion in between. Because the brake shoes are mounted below the swing center, the brake shoes are pressed against the wheel when the brake links swing in the opening direction. Accordingly, when the inner cable is pulled and the rapid traverse cam is moved, the brake links both open, with the amount of opening (feed amount) of the brake links at first being large with respect to the amount the inner cable is pulled, so that the brake shoes quickly strike the lateral surfaces of the rim. As the rate of widening of the cam components decreases, the rate of opening of the brake links with respect to the amount the inner cable is pulled also decreases, and there is a corresponding increase in the pressing force of the brake shoes on the rim.

With this type of structure, if an attempt is made to obtain a powerful braking force, the specified brake link feed amount will not be obtained unless there is an increase in the vertical length of the cam, at least in the portions of the cam where the rate of widening decreases. In actual practice, however, when the vertical length of the cam is thus increased, it can cause problems such as mud adhering, or the lower portion of the cam coming into contact with the wheel at the start of braking. Consequently, there is a dimensional limit to how much the braking force can be raised by lengthening the slower widening portion of the cam, and it is difficult to obtain a high braking force by means of this known cam structure.

Furthermore, since the rate of movement of the brake shoes varies for a given amount of upward movement of the cam, it is necessary that the cam be positioned correctly, i.e, perfectly symmetrical with the vertical axis passing through the wheel. If the cam is misaligned in any way (e.g., inclined relative to the vertical axis or laterally offset to one side of the vertical axis), then one brake shoe may move at a different rate than the other brake shoe, and that brake shoe may contact the rim before the other brake shoe. This, in turn, means that the desired braking force will not be obtained, and one of the brake shoes will wear out faster than the other.

SUMMARY OF THE INVENTION

The present invention is directed to a braking device wherein a powerful braking force is obtained with a feed variation mechanism without imposing too much limitation on the dimensions of the brake device, while making it less likely that the swing balance of the brake links will be lost midway through the braking operation. In one embodiment of the present invention, a bicycle brake device brakes a wheel by pressing first and second opposing brake shoes against the wheel in response to operation of a control cable having an inner cable that moves in first and second directions relative to an outer casing. The first brake link includes a first support component for swingably mounting the first brake link to the bicycle, a first shoe attachment component, and an outer stop component for fixing the outer casing of the control cable. The second brake link includes a second support component for swingably mounting the second brake link to the bicycle and a second shoe attachment component. An inner cable receiving mechanism is coupled to the second brake link for receiving the inner cable so that the second brake link moves in response to movement of the inner cable, wherein the inner cable receiving mechanism includes a movement variation mechanism for varying the rate of movement of the second brake link per unit movement of the inner cable. A transmission mechanism extends between the first brake link and the second brake link so that movement of the inner cable causes movement of both the first brake link and the second brake link. In a more specific embodiment, the movement variation mechanism progressively reduces the rate of movement of the second brake link per unit movement of the inner cable in the first direction.

The movement variation mechanism can take many forms. For example, the movement variation mechanism may comprise a pulley rotatably mounted around an eccentric axis, wherein the inner cable passes around the pulley.

In this case, the first brake link may include an inner cable attachment component spaced apart from the outer stop component, and the inner cable may include a first portion extending from the outer stop component to the pulley and a second portion extending from the pulley to the inner cable attachment component. The second portion of the inner cable then forms the transmission mechanism. Alternatively, the movement variation mechanism may comprise a lever member having a mounting component pivotably mounted to the second brake link. In this case the lever member may include a cable stop component having a cable stop spaced apart from the mounting component, and a transmission stop component having a transmission stop spaced apart from the mounting component. The inner cable is attached to the cable stop, and the transmission mechanism extends from the transmission stop to the first brake link.

The present invention may be applied to cantilever type brakes, side-pull caliper type brakes, or many other types of brakes. If used with cantilever type brakes, the brakes may include a swing balance adjusting mechanism for adjusting a swing balance of the first and second brake links. Since the feed increase is varied with just a feed variation mechanism that is mounted to only the second brake link, rather than to both brake links, if the swing balance is adjusted at the outset, there will tend to be no loss of swing balance midway through the braking operation. Furthermore, the feed increase is varied according to the increase in the pull amount of the inner cable by the feed variation mechanism mounted to the second brake link, and this is transmitted to the first brake link, so if the feed increase is gradually decreased, the braking force can be gradually increased without the use of a cam. Since the magnitude of the braking force here is dependent only on the feed increase, which is varied by the feed variation mechanism, there are no dimensional limitations such as those imposed by a cam. Accordingly, a powerful braking force can be obtained without imposing too much limitation on the dimensions of the brake mechanism.

DETAILED DESCRIPTION OF THE EMBODIMENTS

Figure 1:
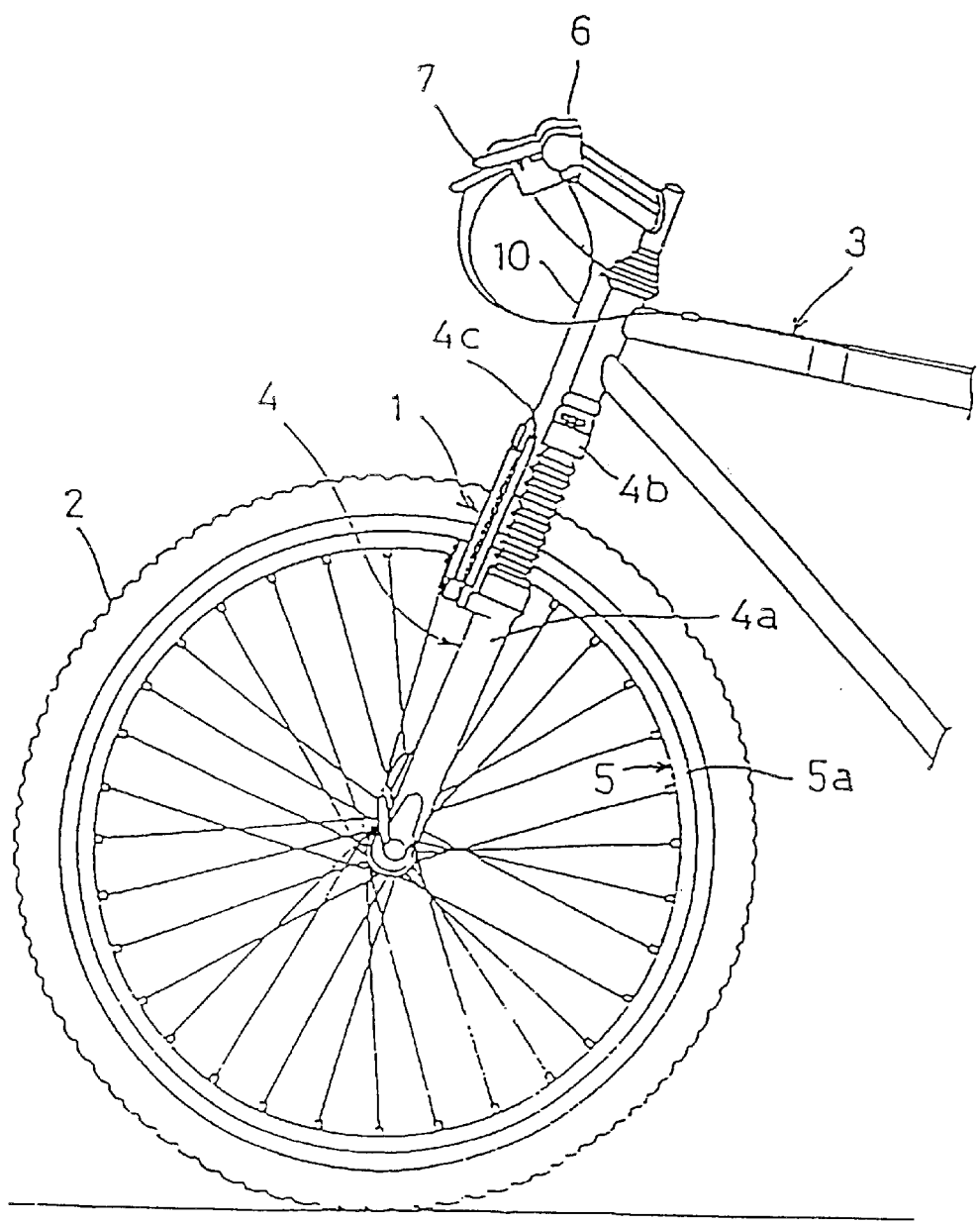
FIG. 1 is a side view of a front portion of a bicycle in which a particular embodiment of the present invention is employed.
Figure 2:
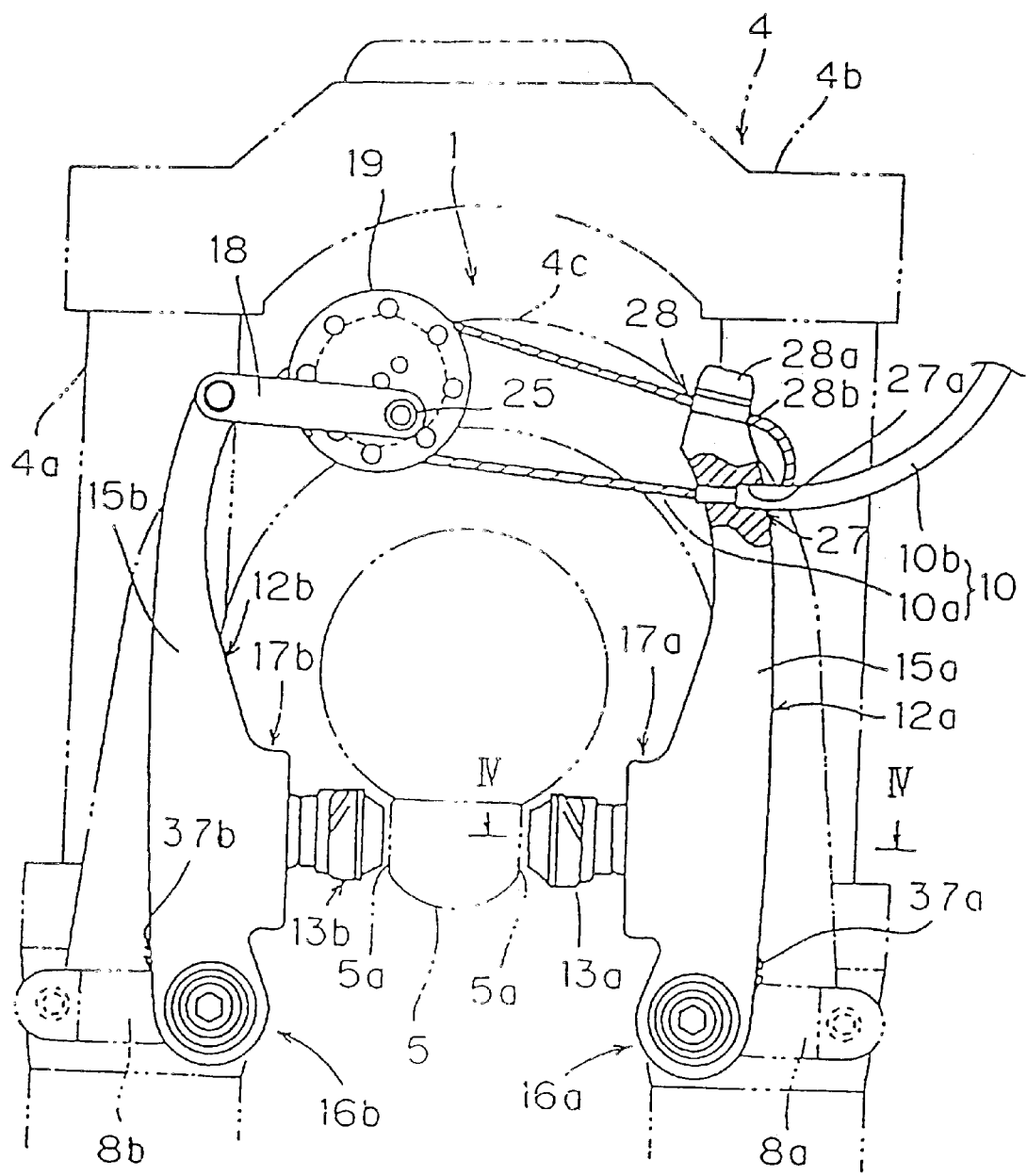
FIG. 2 is a front view of a particular embodiment of a braking device according to the present invention.

In FIGS. 1 and 2, the side-pull cantilever type of brake device 1 pertaining to an embodiment of the present invention is used on a front wheel, for example, and provides a braking action by pressing against the lateral surfaces 5a of the rim 5 of the front wheel 2. The brake device 1 is swingably supported on the front fork 4 of a frame 3.

Figure 5:
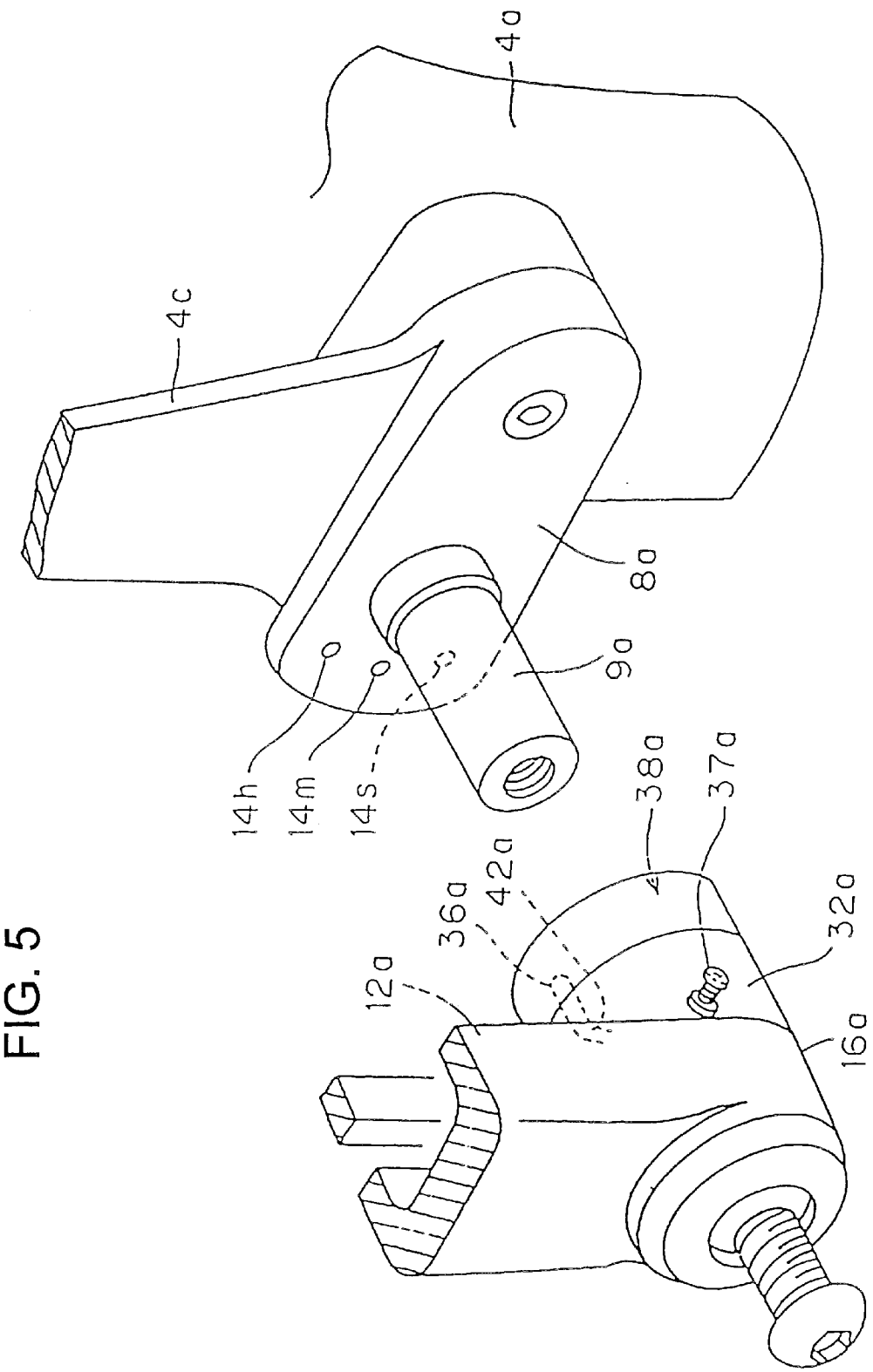
FIG. 5 is a detailed oblique view showing how the brake device is mounted to the bicycle.

The front fork 4 is an air-oil or elastomer type of suspension fork which is capable of absorbing shocks from the road surface. The front fork 4 has a pair of left and right suspension components 4a, an attachment component 4b that is used to attach the pair of suspension components 4a, and a stabilizer 4c that is used to reinforce the suspension components 4a. The stabilizer 4c has roughly an inverted U shape that branches in two, the lower ends of which are fixed midway along the suspension components 4a, and which has a pair of left and right seats 8a and 8b at the two ends. As shown in FIG. 5, stepped fixing pins 9a and 9b (only 9a is shown) that jut forward are provided to the seats 8a and 8b, respectively. The seats 8a and 8b also have three stop holes 14h, 14m, and 14s, which are used to stop the brake release torsion coil spring (discussed below) that is provided to the brake device 1, and which are provided on a circle whose center is the center of the fixing pins 9a and 9b.

Figure 3:
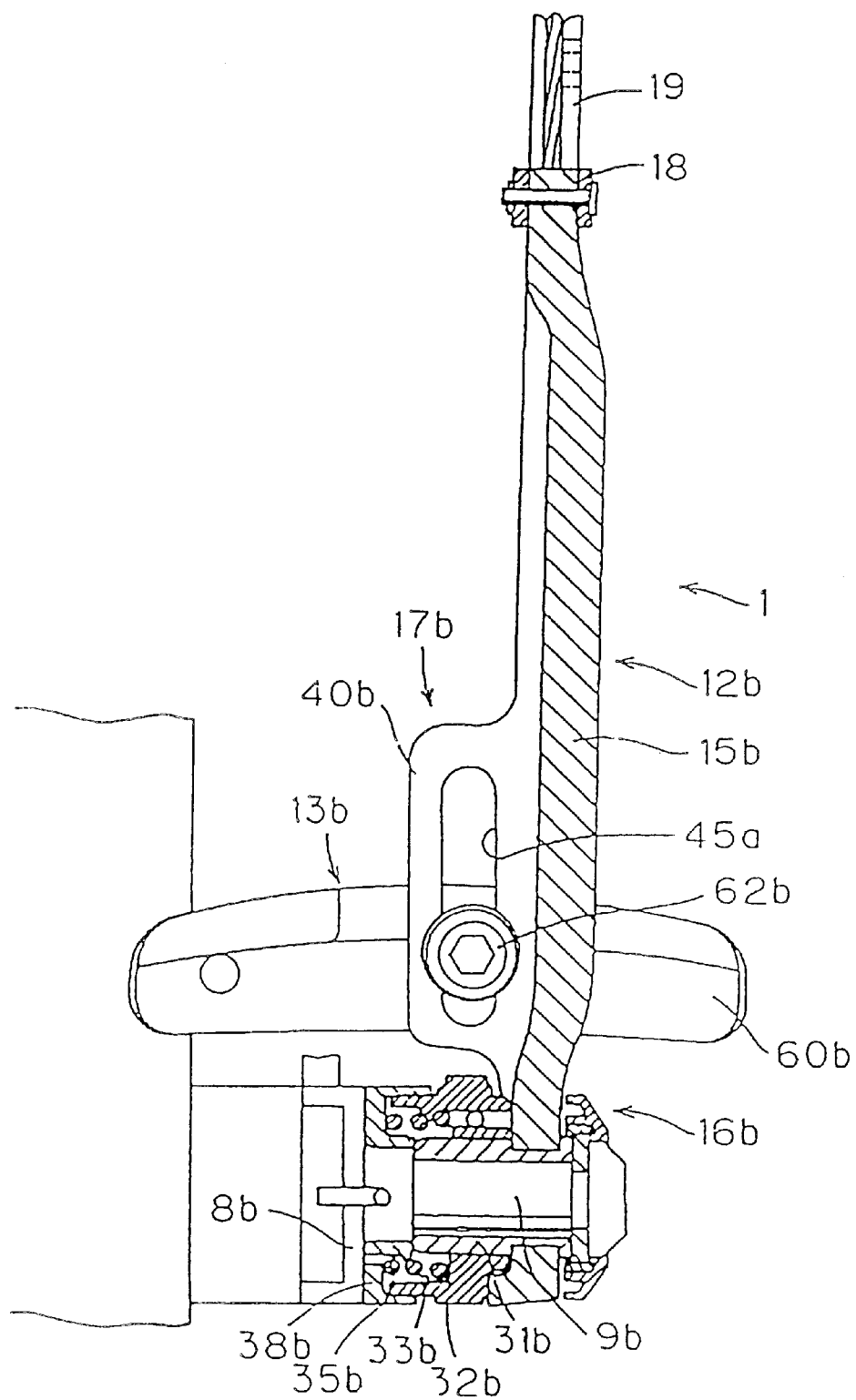
FIG. 3 is a side cross-sectional view of the brake device shown in FIG. 2.

As shown in FIGS. 1 through 3, the brake device 1 is linked to the distal end of a control cable 10. The base end of this control cable 10 is linked to a brake lever 7 that is provided to the handlebar 6. The control cable 10 has an inner cable 10a whose base end is stopped at the brake lever 7, and an outer casing 10b that is stopped at the attachment frame of the brake lever 7 and through the inside of which the inner cable 10a moves.

The brake device 1 has a pair of left and right brake links 12a and 12b that swing. Brake shoes 13a and 13b are attached in the middle of the brake links 12a and 12b so that they face each other and their attachment angle can be adjusted. The brake links 12a and 12b have plate-form link units 15a and 15b, respectively, that extend upward and are thinner on the back side. The base ends of the link units 15a and 15b are provided with rotational support components 16a and 16b that are rotatably supported on the fixing pins 9a and 9b that extend from the seats 8a and 8b. The middle portion is provided with shoe attachment components 17a and 17b that are used to attach the brake shoes 13a and 13b. A connecting link 18, which is positioned so that it faces laterally, is swingably mounted to the distal end of the link unit 15b. A rotating shaft 25 is mounted to the distal end of the connecting link 18, and an eccentric pulley 19 is rotatably mounted to the rotating shaft 25.

Figure 6:
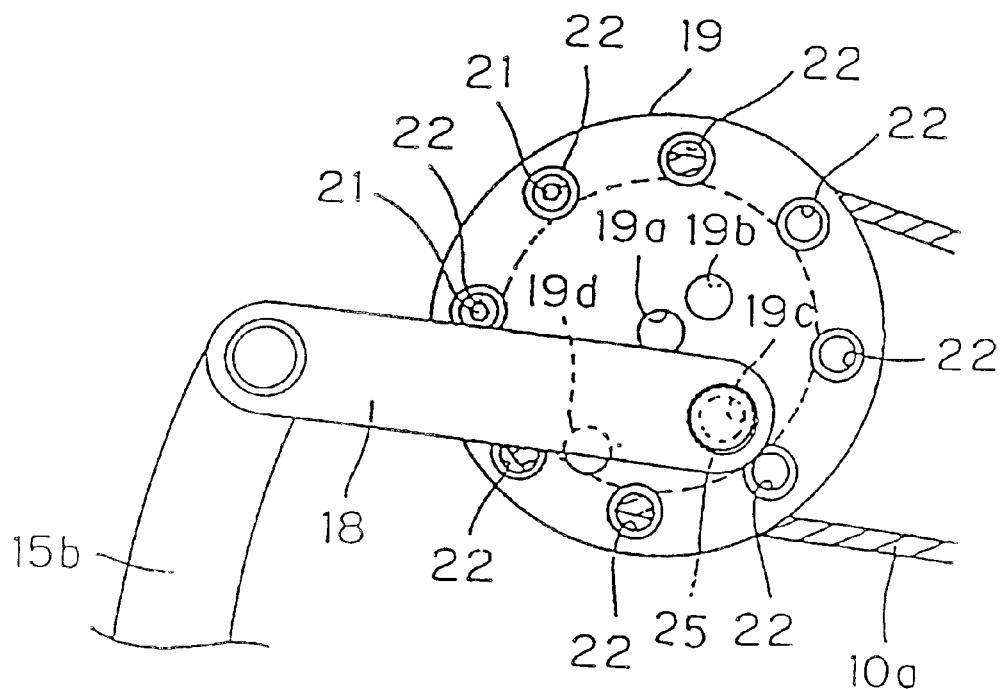
FIG. 6 is a detailed view of a particular embodiment of an eccentrically mounted pulley used in the brake device shown in FIG. 2.
Figure 7:
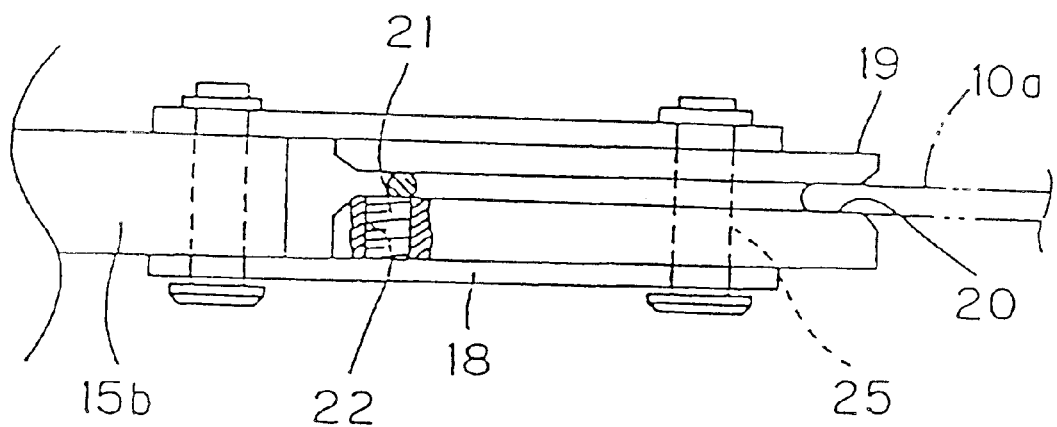
FIG. 7 is a top view of the pulley shown in FIG. 6.

As shown in FIGS. 6 and 7, the eccentric pulley 19 has a groove 20 around the outside of which the inner cable 10a can be wound. Eight screw holes 22, which are used for mounting hex screws 21 for preventing the slippage of the inner cable 10a that is wound around the groove 20, are formed at equal intervals in the peripheral direction in the front surface of the eccentric pulley 19. The screw holes 22 go all the way through the front surface to the groove 20. The hex screws 21 are threaded into one or more of these eight screw holes 22 and stop the inner cable 10a so that it is incapable of relative motion in the groove 20. A center hole 19a is formed in the eccentric pulley 19, and three eccentric rotational center holes 19b through 19d are formed at different radial positions. Providing the plurality of eccentric rotational center holes 19b through 19d allows the characteristics of the increase in braking force and the increase in feed amount of the brake links 12a and 12b to be greatly varied according to the increase in the amount the inner cable is pulled.

As shown in FIG. 2, a second stop component 28 for stopping the inner cable 10a is provided to the distal end of the link unit 15a. Below the second stop component 28, a first stop component 27 for stopping the outer casing 10b is formed a short distance away from the second stop component 28. The second stop component 28 has a round-head screw 28a that is threaded into the distal end of the link unit 15a, and a washer 28b for stopping the inner cable 10a. The first stop component 27 has a countersunk hole 27a that opens to the left and right of the link unit 15a. The inner cable 10a, which extends from the outer casing 10b at the first stop component 27, is wound into the groove 20 of the eccentric pulley 19 and is guided to and fixed at the second stop component 28. As a result, the swing of the second brake link 12b is transmitted to the first brake link 12a. Provision of an eccentric pulley 19 such as this allows the increase in the amount of feed of the brake links 12a and 12b to be varied according to the increase in the amount of pull.

Figure 8:
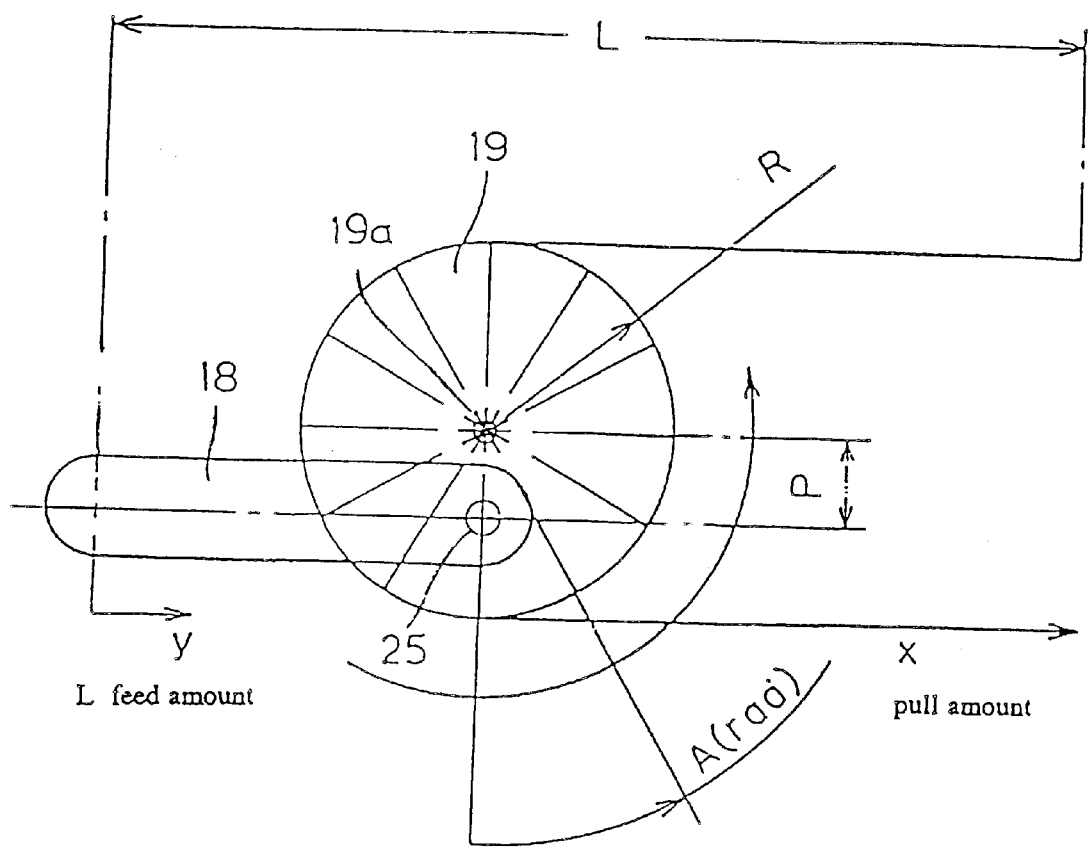
FIG. 8 is a model diagram illustrating the relationship between the feed amount and the pull amount in the pulley shown in FIG. 7.

The relationship between the amount of pull x of the inner cable and the amount of feed y of the second brake link 12b (the change in the spacing L of the two brake links) when an eccentric pulley 19 such as that above is used will now be described through reference to the model shown in FIG. 8. In this model diagram, the radius of the eccentric pulley 19 is termed R, the eccentric radius P, and the rotational angle A (in radians), which gives the relationship between the pull amount x and the feed amount y. The rotation commencement position is the position at which the center hole 19a of the eccentric pulley 19 is directly above the rotating shaft 25.

Here, the feed amount y is in the relation expressed by the following formula with respect to the pull amount x:

$y=(x/2)+P*\sin(A)$ $x=R*A$

Therefore, from the above two formulas we obtain $y=(x/2)+P*\sin(x/R)$

Figure 9:
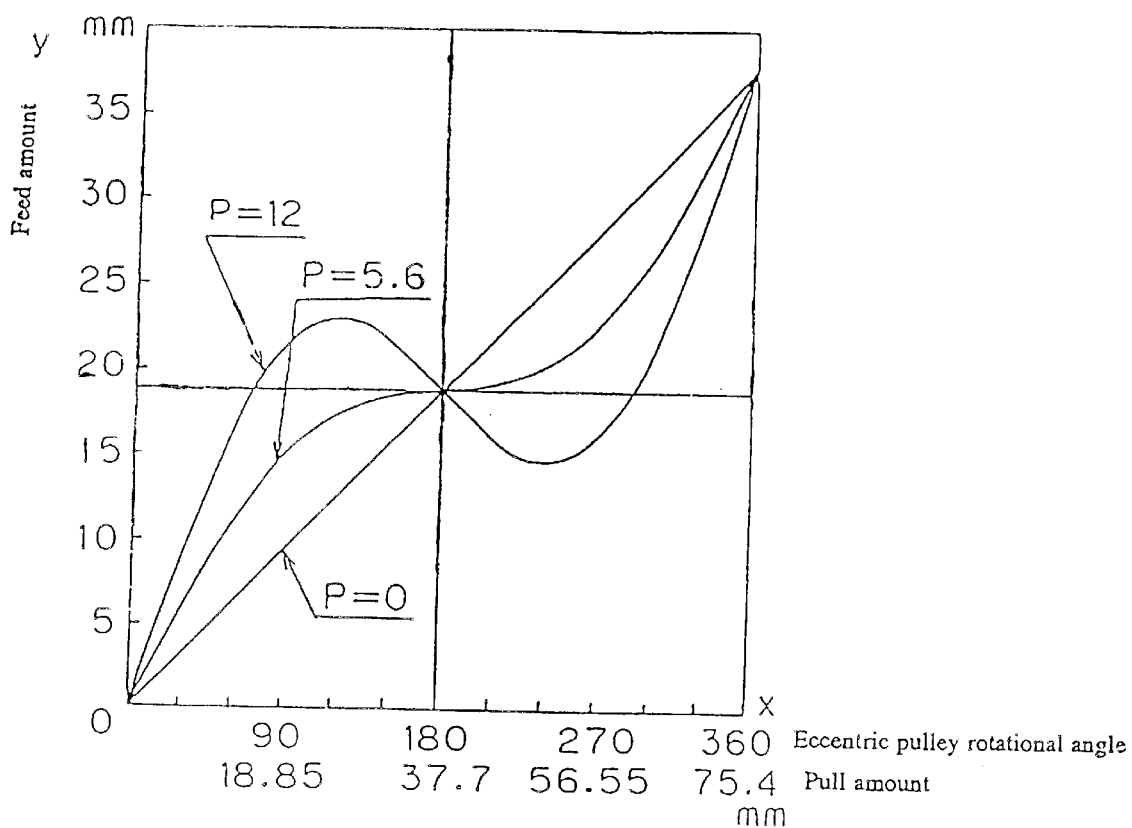
FIG. 9 is a graph illustrating the relationship between the feed amount and the pull amount in the pulley shown in FIG. 7.

FIG. 9 is a graph of the relation expressed by this numerical formula. In FIG. 9, the feed amount y is plotted on the vertical axis, and the pull amount x is plotted on the horizontal axis. The radius R of the eccentric pulley 19 is 12 mm. Here, the relationship between the two variables is plotted for when the eccentric radius P is 0 mm, 5.6 mm, and 12 mm. As is clear from the graph and numerical formula, when the eccentric radius P is up to 6 mm, the increase in the feed amount y gradually decreases with respect to the increase in the pull amount x up to a rotational angle of 180 degrees, and conversely increases over 180 degrees. Also, when the eccentric radius P exceeds 6 (half of the radius R), two peaks occur around 180 degrees. The spacing of these two peaks gradually increases according to the increase in the eccentric radius P. The above tendency is pronounced ahead of the first peak and after the second peak, and the feed amount decreases with respect to an increase in the pull amount between these two peaks.

Setting the optimal curve and the rotation commencement position thereof from the characteristics curve for each eccentric radius P allows the selection of rapid or slow traverse, and allows the increase in the feed amount to be adjusted as desired. For example, if the rotating shaft 25 is positioned on the right side (in FIG. 6) of the center hole 19a, then the rotation commencement position is set to a position between 0 and 180 degrees in the graph in FIG. 9. Therefore, when the eccentric radius P is 6 mm or less, the increase in the feed amount with respect to the increase in the pull amount x (y/x) gradually becomes smaller up to 180 degrees, and increases when 180 degrees is exceeded. Two peaks appear when the eccentric radius P exceeds 6 mm, and the same tendency as above is seen around the peaks, with the feed amount decreasing with respect to an increase in the pull amount between the peaks. Accordingly, when rapid traverse is required, the rotation commencement position and the rotation conclusion position should be set within a range of 0 to 180 degrees when the eccentric radius P is no more than one-half the radius R. When the eccentric radius P exceeds one-half the radius R, the rotation commencement position should be set so that the rotation conclusion position will be ahead of the first peak. In this embodiment, the eccentric radius P was set at 5.6 mm, the rotation commencement position was set at 60 degrees, and the rotation conclusion position was set at 120 degrees.

Conversely, when slow traverse is required, the rotating shaft 25 should be positioned on the left side (in FIG. 6) of the center hole 19a, and the rotation commencement position and the rotation conclusion position should be set within a range of 180 to 360 degrees in the graph in FIG. 9 when the eccentric radius P is no more than one-half the radius R. When the eccentric radius P is over the radius R, the rotation conclusion position should be set so that the rotation commencement position will be after the second peak. These rotation commencement positions can be adjusted by suitably varying the mounting position of the hex screws 21 and the stop position of the inner cable 10a that is stopped at the second stop component 28.

The rotation support components 16a and 16b, as shown in FIG. 3 (only the b side is shown), have cylindrical bushings 31a and 31b that are fixed by flaring to the base ends of the link units 15a and 15b and are fitted to the fixing pins 9a and 9b, and bottomed cylindrical spring covers 32a and 32b that are fixed to the outer periphery of the bushings 31a and 31b. Cylindrical spaces 33a and 33b are formed between the spring covers 32a and 32b and the bushings 31a and 31b, and these spaces 33a and 33b house brake link biasing mechanisms in the form of torsion coil springs 35a and 35b that bias the brake links 12a and 12b toward the brake release side.

The rear ends 36a and 36b of the torsion coil springs 35a and 35b, as shown in FIG. 5 (only the a side is shown), are stopped at one of three stop holes 14h through 14s provided to the seats 8a and 8b. Varying the stop position to these stop holes 14h through 14s allows the intensity of the force to the brake release side to be adjusted in three stages. The front ends (not shown) are stopped at the bottom of the spring covers 32a and 32b. The stop position of the front ends of the torsion coil springs 35a and 35b of the brake links 12a and 12b can be moved in the peripheral direction of the fixing pins 9a and 9b by means of spring adjustment screws 37a and 37b that are threaded into the outer surface of the spring covers 32a and 32b. These spring adjustment screws 37a and 37b move the stop position of the front ends of the torsion coil springs 35a and 35b and thereby adjust the spring force, which allows the swing balance of the brake links 12a and 12b in the release position to be adjusted.

Spring caps 38a and 38b that cover the rear ends of the torsion coil springs 35a and 35b are rotatably mounted to the rear of the spring covers 32a and 32b. Through holes 42a and 42b (only the a side is shown in FIG. 5), through which the rear ends 36a and 36b of the torsion coil springs 35a and 35b are passed, are formed in the bottoms of the spring caps 38a and 38b, and are able to stop the rear ends of the torsion coil springs 35a and 35b.

Figure 4:
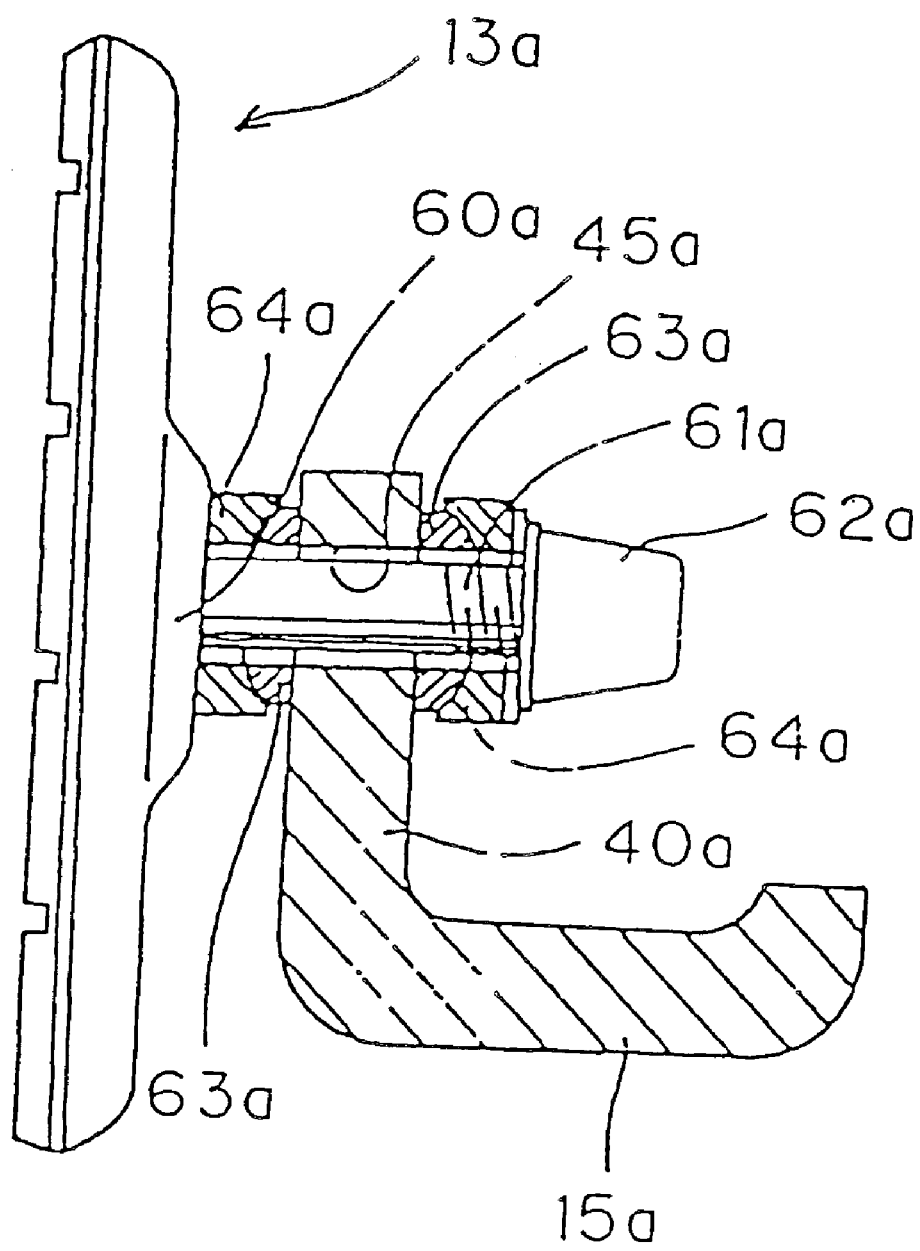
FIG. 4 is a view taken along line IV—IV in FIG. 2.

As shown in FIGS. 3 and 4, the shoe attachment components 17a and 17b have shoe attachment brackets 40a and 40b formed such that they extend rearward from the central inner side of the lower portions of the link units 15a and 15b. Slots 45a and 45b in which the brake shoes 13a and 13b are mounted are formed in the shoe attachment brackets 40a and 40b.

As shown in FIG. 4, the brake shoes 13a and 13b are inserted into the slots 45a and 45b. The brake shoes 13a and 13b have, respectively, rubber shoe units 60a and 60b and shoe attachment pins 61a and 61b that extend outward from the approximate center in the lengthwise direction. Male threads are formed at the distal ends of the shoe attachment pins 61a and 61b, and the brake shoes 13a and 13b are fixed to the shoe attachment brackets 40a and 40b by nuts 62a and 62b that screw onto these male threads. Convex washers 63a and 63b that have a convex surface that makes up part of a spherical surface, and concave washers 64a and 64b that have a concave surface that engages with this convex surface, are positioned between the nuts 62a and 62b and the shoe attachment brackets 40a and 40b, and between the shoe units 60a and 60b and the shoe attachment brackets 40a and 40b. The tightening here of the brake shoes 13a and 13b inside the slots 45a and 45b of the shoe attachment brackets 40a and 40b via the convex washers 63a and 63b and the concave washers 64a and 64b allows the vertical position and the inclination of the brake shoes 13a and 13b to be freely adjusted as dictated by the position and inclination of the lateral surfaces 5a of the rim 5.

Since the brake shoes 13a and 13b are positioned on the front fork 4 side (to the rear) of the brake links 12a and 12b, they are closer to the front fork 4, and a smaller moment is produced by the repulsive force from the rim 5 that acts on the brake shoes 13a and 13b. Accordingly, fork torsion will tend not to decrease the braking force even when a suspension fork of relatively low torsional rigidity is used. Also, since the shoe units 60a and 60b are themselves thin, there is less bending deformation of the shoe units 60a and 60b during braking, and there is even less decrease in the braking force.

The operation of the brake device 1 during braking will now be described. When the brake lever 7 is operated, the inner cable 10a is pulled through the outer casing 10b. As the inner cable 10a is pulled, the second brake link 12b swings while the increase in the feed amount y with respect to the increase in the pull amount x (y/x) changes. As a result, this swing is transmitted to the first brake link 12a by the inner cable 10a, and the two brake links 12a and 12b swing in their closing directions against the biasing force of the torsion coil springs 35a and 35b by the feed amount y. If a rapid traverse has been set at this point, the increase in the feed amount y with respect to the increase in the pull amount x of the inner cable 10a (y/x) gradually becomes smaller, and there is rapid traverse at first, so the shoe units 60a and 60b quickly strike the lateral surfaces 5a of the rim 5. Also, a change in the feed amount y is accomplished with just the eccentric pulley 19 mounted to the second brake link 12b, so if the biasing force of the torsion coil springs 35a and 35b is adjusted by means of the spring adjustment screws 37a and 37b, and the swing balance at the release position of the brake links 12a and 12b is suitably adjusted, there will be no loss of swing balance midway through the operation. Also, since the feed increase can be freely adjusted by means of the rotation commencement position and the eccentric radius of the eccentric pulley 19 mounted on the second brake link 12b, a powerful braking force can be obtained by lowering the feed increase.

Braking force is generated when the shoe units 60a and 60b of the brake shoes 13a and 13b strike the lateral surfaces 5a of the rim 5. The braking force generated at this point is inversely proportional to the feed increase (y/x), and so it gradually increases according to the increase in the pull amount x. However, even if the braking force increases, the tensile force acting on the inner cable 10a need not change, and even if the force by which the brake lever 7 is operated decreases, a powerful braking force can be obtained in the latter half of the braking, so less effort is needed for brake operation. As a result, even when the brakes are used frequently, as in a downhill race, improper braking caused by diminished grip strength can be reduced.

When the brake lever 7 is released, the inner cable 10a slackens, and the biasing force of the torsion coil springs 35a and 35b causes the brake links 12a and 12b to swing in their opening directions, and causes the distal ends of the shoe units 60a and 60b of the brake shoes 13a and 13b to move away from the lateral surfaces of the rim, so that braking is released.

Thus, the increase in the feed amount with respect to the increase in the pull amount x of the inner cable (cable stroke) (y/x) can be freely adjusted by making the rotational center eccentric and stopping the inner cable 10a so that it is immobile. Accordingly, rapid traverse or slow traverse can be selected freely, and this allows the braking force to be adjusted freely as well.

Figure 10:
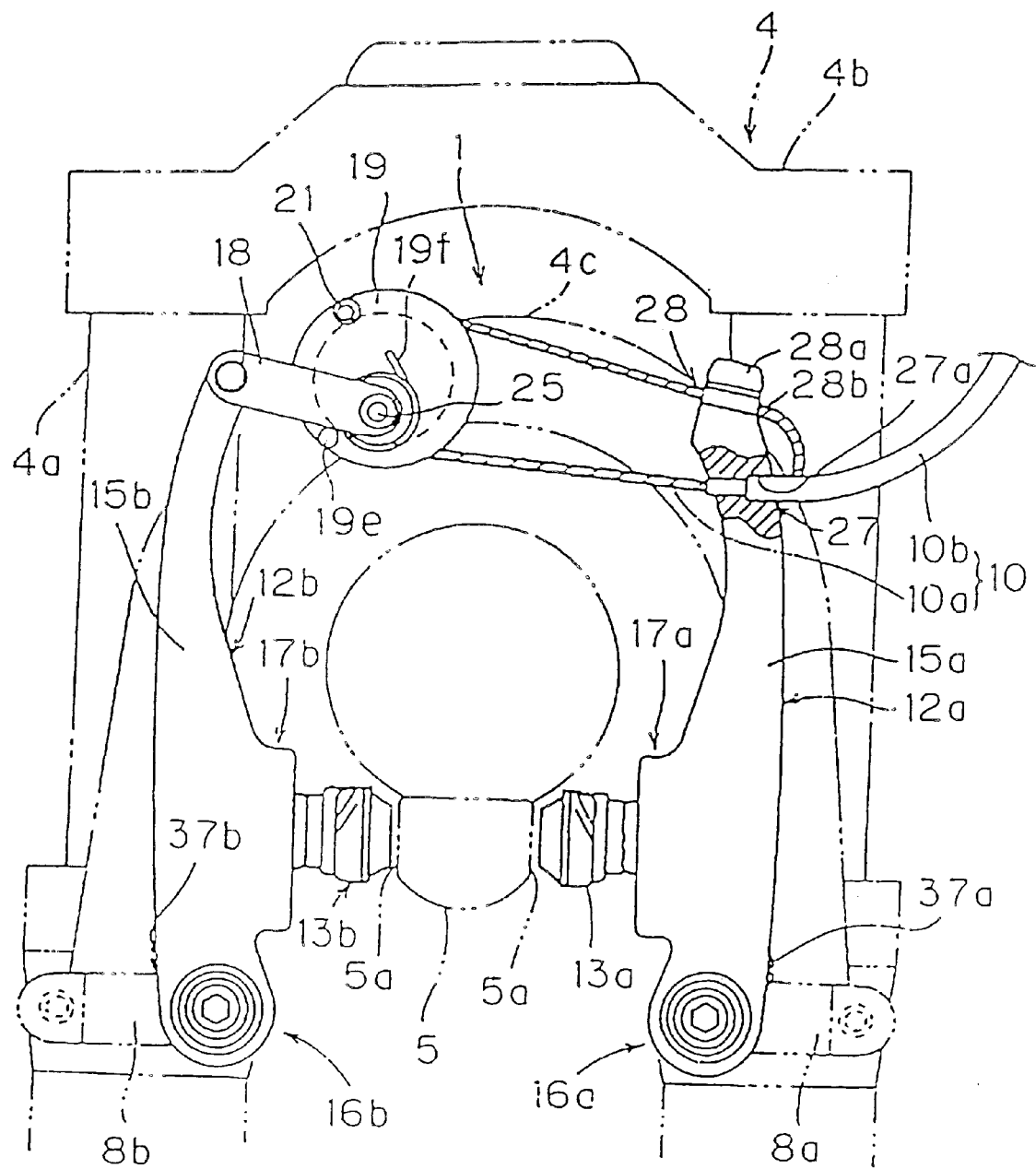
FIG. 10 is a front view of another embodiment of a braking device according to the present invention.

In the above embodiment, the rotation commencement position was set by means of the stop position of the inner cable 10a to the second stop component 28, but a mechanism for setting the rotation commencement position may instead be provided to the eccentric pulley 19, as shown in FIG. 10. A protruding pin 19e that is stopped at the connecting link 18 is provided to the front surface of the eccentric pulley 19. This protruding pin 19e is used to locate the eccentric pulley 19 in the rotation commencement position, and restricts the rotation of the eccentric pulley 19 in the opposite direction from the rotation direction at the rotation commencement position. Also, a pulley biasing mechanism in the form of a torsion spring 19f is disposed around the periphery of the rotating shaft 25 in the space between the front surface of the eccentric pulley 19 and the connecting link 18. One end of the torsion spring 19f is stopped at the front surface of the eccentric pulley 19, and the other end at the connecting link 18, and this spring biases the eccentric pulley 19 in the opposite direction from the rotation direction. As a result of this structure, the eccentric pulley 19 always maintains the same attitude at the start of its rotation. Accordingly, when the inner cable is replaced after it has been taken off, there is no need for the rotation commencement position to be re-adjusted every time, and the feed increase (x/y) can always be adjusted to the same magnitude.

Figure 11:
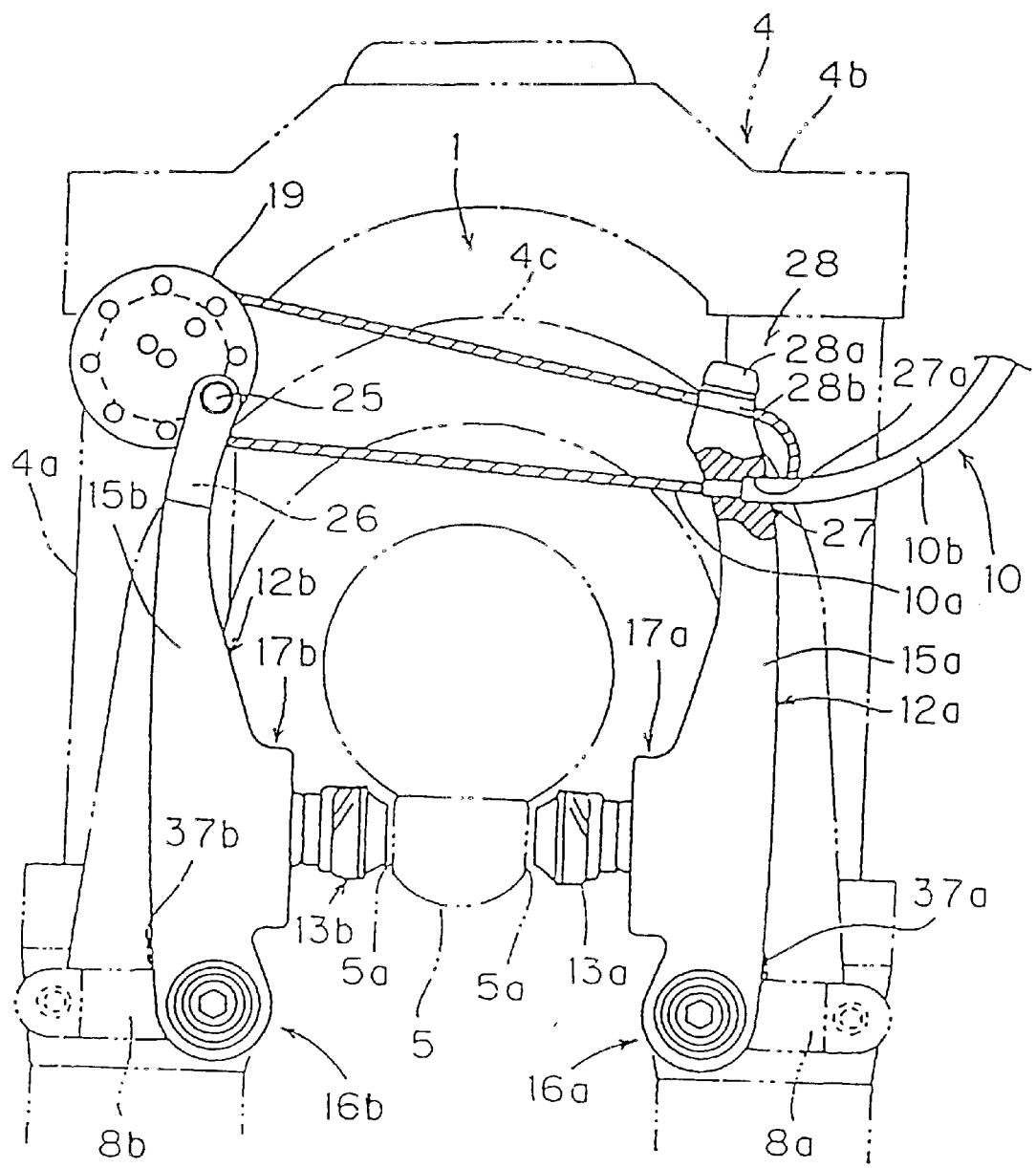
FIG. 11 is a front view of another embodiment of a braking device according to the present invention.

Instead of the eccentric pulley 19 being mounted on the connecting link 18, a two-pronged bracket 26 may be formed at the distal end of the link unit 15b, and the eccentric pulley 19 mounted inside the bracket 26, as shown in FIG. 11. In this case, there is a larger space between the eccentric pulley 19 and the wheel, so mud clogging and the like are less likely to occur, and the eccentric pulley 19 is less likely to interfere with the rim 5.

Figure 12:
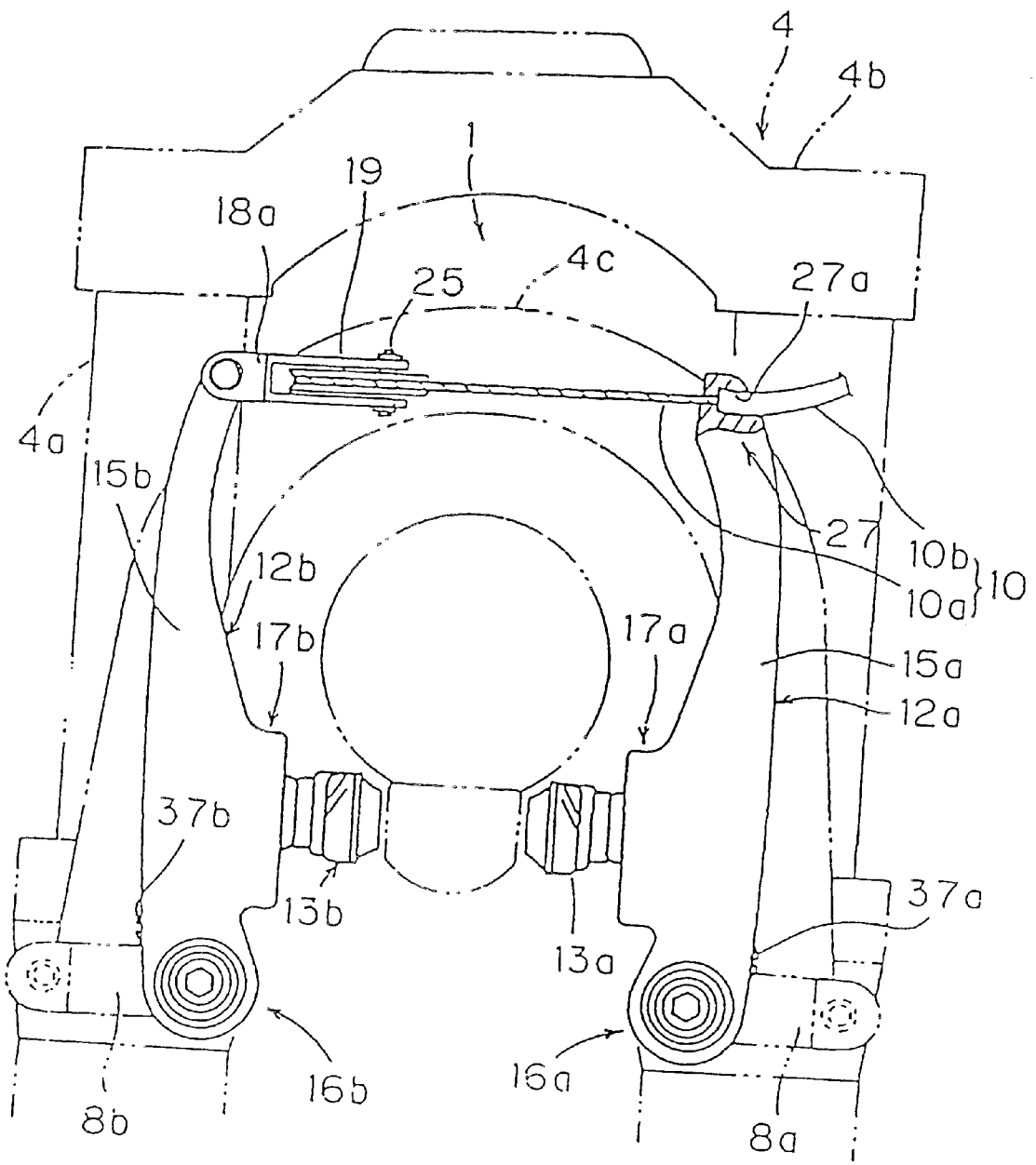
FIG. 12 is a front view of another embodiment of a braking device according to the present invention.

As shown in FIG. 12, the eccentric pulley 19 may be mounted such that it can rotate around an axis that intersects the swing axis of the second brake link 12b at a right angle, and the inner cable 10a that is wound around the eccentric pulley 19 may be positioned away from the wheel in the peripheral direction thereof. A connecting link 18a is linked to the distal end of the link unit 15a such that it can swing more or less around the horizontal axis, and the eccentric pulley 19 is supported at the distal end of the connecting link 18 such that it can rotate more or less around the vertical axis. The first stop component 27 and a second stop component (not shown) are positioned away from the wheel in the peripheral direction thereof. The rest of the structure and operation are the same as in the above embodiment, and so will not be described here.

In this case, the surface area of the eccentric pulley 19 in the radial direction of the wheel becomes smaller as the space between the wheel and the inner cable 10a widens, making it less likely that mud clogging will occur or that this clogging will cause problems such as wheel lock.

Figure 13:
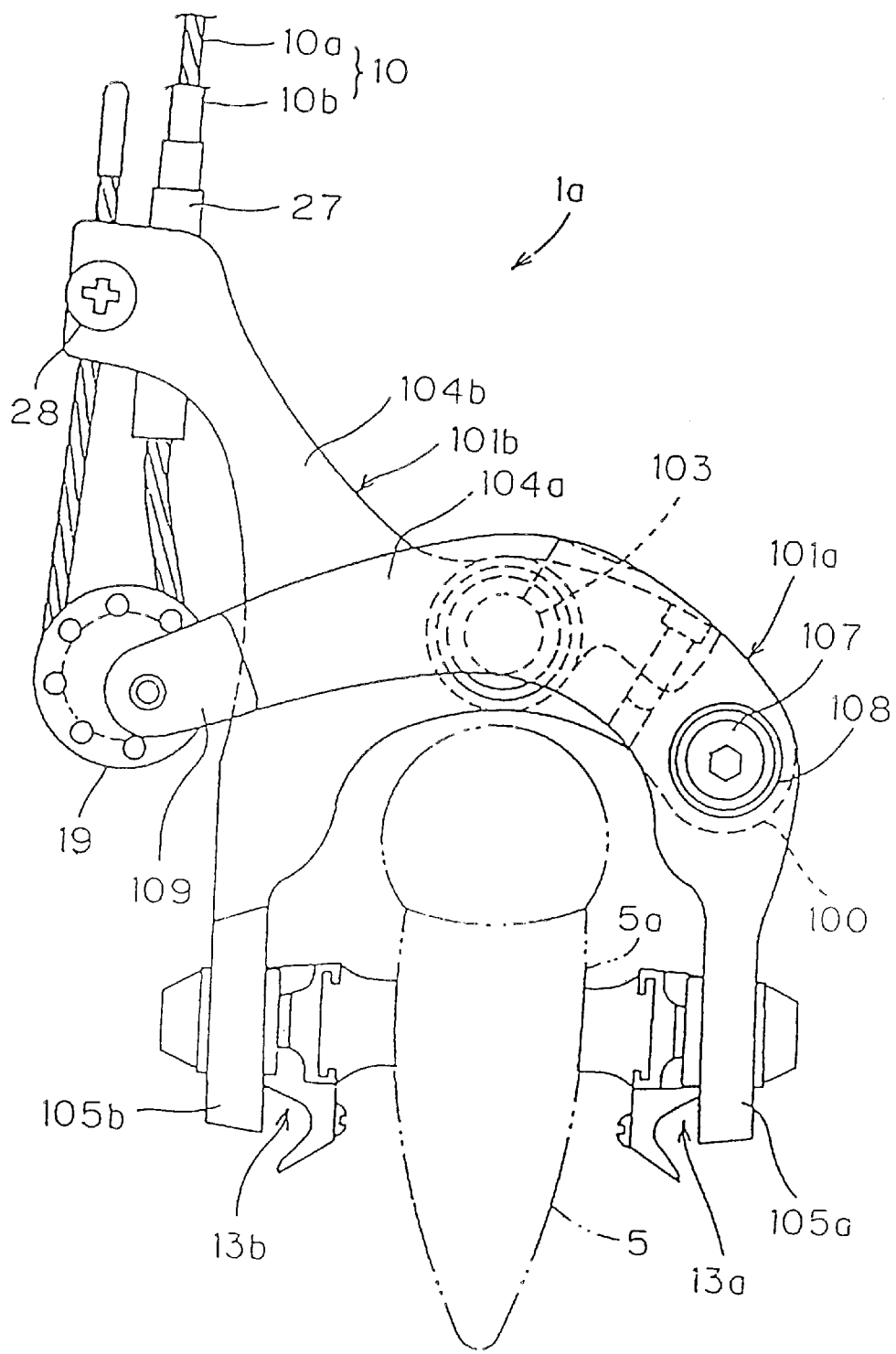
FIG. 13 is a front view of another embodiment of a braking device according to the present invention.

As shown in FIG. 13, the eccentric pulley 19 may be mounted to a caliper type of brake device 1a instead of a cantilever type of brake device. In FIG. 13, the caliper type of brake device 1a has a gate component 100, an outer brake link 101a that is swingably linked to the distal end of the gate component 100, an inner brake link 101b that is swingably linked to the base end of the gate component 100, and an biasing member (not shown) that biases the brake links 101a and 101b to the release side.

The gate component 100 is a rod-shaped member, the base end of which is mounted by a mounting bolt 103 to the front or rear fork of the bicycle. The inner brake link 101b is swingably supported by this mounting bolt 103.

The outer brake link 101a has a roughly C-shaped link unit 104a, and a shoe attachment component 105a that is provided to the distal end of the link unit 104a. The second stop component 28 that stops the inner cable 10a is provided to the base end of the link unit 104a. A support component 108 for a support bolt 107 that is mounted to the distal end of the gate component 100 is provided at a midway point. A bracket 109 is formed at the base end of the link unit 104a of this outer brake link 101a, and the eccentric pulley 19 is mounted to this bracket 109.

The inner brake link 101b has a roughly Y-shaped link unit 104b, and a shoe attachment component 105b that is provided to one of the distal ends of the link unit 104b. The first stop component 27, which stops the outer casing 10b, and the second stop component 28, which stops the inner cable 10a, are positioned next to each other at the base end (upper end) of the link unit 104b. The brake shoes 13a and 13b are mounted to the shoe attachment components 105a and 105b.

With a caliper type of brake device 1a structured such as this, when the brake lever is pulled, the inner cable 10a is pulled through the outer casing 10b, and the two brake links 101a and 101b swing in their closing directions against the biasing force of the biasing member. Here again, the feed increase (y/x) changes according to the increase in the pull amount. A braking force is then generated when the brake shoes 13a and 13b strike the lateral surfaces 5a of the rim 5.

Figure 14:
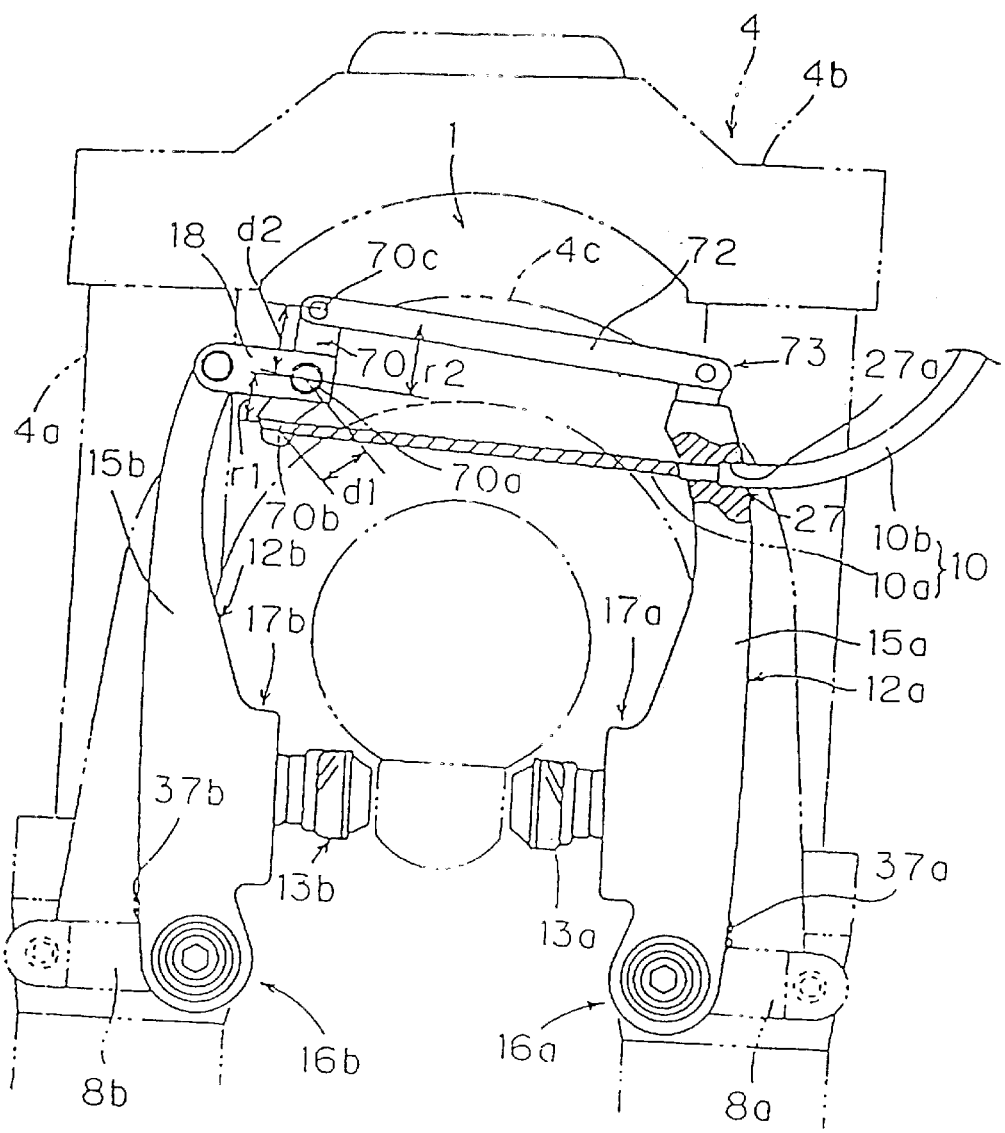
FIG. 14 is a front view of another embodiment of a braking device according to the present invention.

As long as the feed variation means is able to vary the feed increase according to the increase in the pull amount, it does not need to be the eccentric pulley 19, and may instead be a rotating lever 70, as shown in FIG. 14.

The rotating lever 70 is shaped such that it is bent at its rotational center. The rotating lever 70 has a mounting component 70a that is rotatably mounted to the second brake link 12b by the connecting link 18, a cable stop component 70b that is positioned to one side of and a distance d1 away from the mounting component 70a and that stops the inner cable 10a, and a link stop component 70c that is positioned somewhere besides on the line that connects the mounting component 70a and the cable stop component 70b and to the other side of and a distance d2 away from the mounting component 70a. One end of a transmission link 72 is swingably linked to the link stop component 70c. A link attachment component 73 is provided to the distal end of a first brake link that is used to swingably attach the other end of the transmission link 72.

With this embodiment, the shortest distance r1 from the mounting component 70a to the inner cable 10a, and the shortest distance r2 from the mounting component 70a to the transmission link 72 vary with the rotational position of the rotating lever 70, so the feed increase (y/x) varies according to the increase in the pull amount. The same merits are obtained with a feed variation means structured such as this as with the above-mentioned eccentric pulley.

While the above is a description of various embodiments of the present invention, further modifications may be employed without departing from the spirit and scope of the present invention. For example, the present invention can also be applied to the rear brake instead of the front brake. Thus, the scope of the invention should not be limited by the specific structures disclosed. Instead, the true scope of the invention should be determined by the following claims.

What is claimed is:

1. A bicycle brake apparatus that brakes a wheel by pressing first and second opposing brake shoes against the wheel in response to operation of a control cable having an inner cable that moves in first and second directions relative to an outer casing, the apparatus comprising:

a first brake link including:

a first support component for swingably mounting the first brake link to the bicycle;

a first shoe attachment component; and an outer stop component for fixing the outer casing of the control cable;

a second brake link including:

a second support component for swingably mounting the second brake link to the bicycle; and a second shoe attachment component;

an inner cable receiving mechanism coupled to the second brake link for receiving the inner cable so that the second brake link moves in response to movement of the inner cable;

wherein the inner cable receiving mechanism includes a movement variation mechanism for varying the rate of movement of the second brake link per unit movement of the inner cable as the inner cable moves; and a transmission mechanism extending between the first brake link and the second brake link so that movement of the inner cable causes movement of both the first brake link and the second brake link, wherein the transmission mechanism extends between a free end of the first brake link and a free end of the second brake link so that movement of the inner cable causes the free end of the first brake link and the free end of the second brake link to move towards each other.

2. The apparatus according to claim 1 wherein the movement variation mechanism progressively reduces the rate of movement of the second brake link per unit movement of the inner cable in the first direction.

3. The apparatus according to claim 1 wherein a portion of the inner cable extending between the first brake link and the second brake link is spaced apart from a portion of the transmission mechanism extending between the first brake link and the second brake link.

4. A bicycle brake apparatus that brakes a wheel by pressing first and second opposing brake shoes against the wheel in response to operation of a control cable having an inner cable that moves in first and second directions relative to an outer casing, the apparatus comprising:
   a first brake link including:
      a first support component for swingably mounting the first brake link to the bicycle;
      a first shoe attachment component; and
      an outer stop component for fixing the outer casing of the control cable;
   a second brake link including:
      a second support component for swingably mounting the second brake link to the bicycle; and
      a second shoe attachment component;
   an inner cable receiving mechanism coupled to the second brake link for receiving the inner cable so that the second brake link moves in response to movement of the inner cable;
   wherein the inner cable receiving mechanism includes a movement variation mechanism for varying the rate of movement of the second brake link per unit movement of the inner cable as the inner cable moves; and
   a transmission mechanism extending between the first brake link and the second brake link so that movement of the inner cable causes movement of both the first brake link and the second brake link;
   wherein the movement variation mechanism comprises a pulley rotatably mounted around an eccentrically located axis, and wherein the inner cable passes around the pulley.

5. The apparatus according to claim 4 wherein the first brake link includes an inner cable attachment component spaced apart from the outer stop component, wherein the inner cable includes a first portion extending from the outer stop component to the pulley and a second portion extending from the pulley to the inner cable attachment component, and wherein the second portion of the inner cable forms the transmission mechanism.

6. The apparatus according to claim 4 wherein the pulley includes a plurality of eccentric mounting locations.

7. The apparatus according to claim 4 wherein the movement variation mechanism further comprises an initial position setting mechanism for setting an initial position of the pulley.

8. The apparatus according to claim 7 wherein the initial position setting mechanism comprises a stop member that limits rotation of the pulley relative to the second brake link.

9. The apparatus according to claim 7 wherein the initial position setting mechanism further comprises a pulley biasing mechanism for biasing the pulley to the initial position.

10. The apparatus according to claim 4 further comprising a swing balance adjusting mechanism for adjusting a swing balance of the first and second brake links.

11. The apparatus according to claim 10 wherein the swing balance adjusting mechanism comprises:
   a brake link biasing mechanism for biasing at least one of the first and second brake links to a brake release position; and
   a bias adjusting mechanism for adjusting a bias of the brake link biasing mechanism.

12. The apparatus according to claim 4 wherein the first support component is disposed on an end of the first brake link, wherein the first shoe attachment component is spaced apart from the first support component, wherein the second support component is disposed on an end of the second brake link, and wherein the second shoe attachment component is spaced apart from the second support component.

13. The apparatus according to claim 4 wherein the first support component is disposed on an intermediate portion of the first brake link, wherein the first shoe attachment component is disposed at an end of the first brake link, wherein the second support component is disposed on an intermediate portion of the second brake link, and wherein the second shoe attachment component is disposed at an end of the second brake link.

14. A bicycle brake apparatus that brakes a wheel by pressing first and second opposing brake shoes against the wheel in response to operation of a control cable having an inner cable that moves in first and second directions relative to an outer casing, the apparatus comprising:
   a first brake link including:
      a first support component for swingably mounting the first brake link to the bicycle;
      a first shoe attachment component; and
      an outer stop component for fixing the outer casing of the control cable;
   a second brake link including:
      a second support component for swingably mounting the second brake link to the bicycle; and
      a second shoe attachment component;
   an inner cable receiving mechanism coupled to the second brake link for receiving the inner cable so that the second brake link moves in response to movement of the inner cable;
   wherein the inner cable receiving mechanism includes a movement variation mechanism for varying the rate of movement of the second brake link per unit movement of the inner cable as the inner cable moves; and
   a transmission mechanism extending between the first brake link and the second brake link so that movement of the inner cable causes movement of both the first brake link and the second brake link;
   wherein the movement variation mechanism comprises a lever member having a mounting component pivotably mounted to the second brake link.

15. The apparatus according to claim 14 wherein the lever member further comprises:
   a cable stop component having a cable stop spaced apart from the mounting component;
   a transmission stop component having a transmission stop spaced apart from the mounting component; and
   wherein the transmission mechanism extends from the transmission stop to the first brake link.

16. The apparatus according to claim 14 further comprising a swing balance adjusting mechanism for adjusting a swing balance of the first and second brake links.

17. The apparatus according to claim 16 wherein the swing balance adjusting mechanism comprises:
   a brake link biasing mechanism for biasing the first and second brake links to a brake release position; and
   a bias adjusting mechanism for adjusting a bias of the brake link biasing mechanism.

18. The apparatus according to claim 14 wherein the first support component is disposed on an end of the first brake link, wherein the first shoe attachment component is spaced apart from the first support component, wherein the second support component is disposed on an end of the second brake link, and wherein the second shoe attachment component is spaced apart from the second support component.

19. The apparatus according to claim 14 wherein the first support component is disposed on an intermediate portion of the first brake link, wherein the first shoe attachment component is disposed at an end of the first brake link, wherein the second support component is disposed on an intermediate portion of the second brake link, and wherein the second shoe attachment component is disposed at an end of the second brake link.

* * * * *